(12) United States Patent
Zhang

(10) Patent No.: US 11,746,979 B2
(45) Date of Patent: Sep. 5, 2023

(54) HEADLAMP UNIT BASED ON A POLARIZED BEAM SPLITTER AND AT LEAST TWO LIGHT PATH SYSTEMS

(71) Applicant: HASCO VISION TECHNOLOGY CO., LTD, Shanghai (CN)

(72) Inventor: Jie Zhang, Shanghai (CN)

(73) Assignee: HASCO VISION TECHNOLOGY CO., LTD, Shanghai (CN)

(*) Notice: Subject to any disclaimer, the term of this patent is extended or adjusted under 35 U.S.C. 154(b) by 46 days.

(21) Appl. No.: 17/607,405

(22) PCT Filed: Jul. 20, 2019

(86) PCT No.: PCT/CN2019/096954
§ 371 (c)(1),
(2) Date: Oct. 29, 2021

(87) PCT Pub. No.: WO2021/003769
PCT Pub. Date: Jan. 14, 2021

(65) Prior Publication Data
US 2022/0205609 A1 Jun. 30, 2022

(30) Foreign Application Priority Data
Jul. 11, 2019 (CN) .......................... 201910624948.7

(51) Int. Cl.
*F21S 41/20* (2018.01)
*F21S 41/33* (2018.01)
(Continued)

(52) U.S. Cl.
CPC .......... *F21S 41/285* (2018.01); *F21S 41/135* (2018.01); *F21S 41/33* (2018.01); *F21W 2102/13* (2018.01); *F21W 2107/10* (2018.01)

(58) Field of Classification Search
CPC .......... F21S 41/663; F21S 41/20; F21S 41/24; F21S 41/25; F21S 41/255; F21S 41/26;
(Continued)

(56) References Cited

U.S. PATENT DOCUMENTS 10,086,749 B2 * 10/2018 Himeno ............... F21S 41/321
2016/0169469 A1   6/2016 Sugiyama
2017/0276980 A1 *  9/2017 Kauschke ............ F21S 41/335

FOREIGN PATENT DOCUMENTS

CN   106939992   7/2017
CN   206771182   12/2017
(Continued)

OTHER PUBLICATIONS

Machine Translation DE102017109905A1 (Year: 2018).*
(Continued)

*Primary Examiner* — Robert J May
(74) *Attorney, Agent, or Firm* — JCIP Global Inc.

(57) ABSTRACT

A headlamp unit based on a PBS includes a lens and a beam splitter. Viewed from a reverse light path, parallel light is refracted twice by an incident surface and an emergent surface of the lens and then converged in at least two focuses through the beam splitter. Each focus corresponds to a light path system, and the light path systems may be turned on simultaneously or separately to obtain a corresponding headlamp light pattern. Through beam combination of the PBS, two optical systems may achieve different illumination light shapes through on-off combination of light sources, and the two optical systems do not interfere with each other. The PBS obtains at least two accurate focus positions for the focuses of the lens, and an ideal light pattern may be accurately obtained. An upper beam light pattern may partially cover a lower beam light pattern.

14 Claims, 6 Drawing Sheets

(51) Int. Cl.
*F21S 41/135* (2018.01)
*F21W 102/13* (2018.01)
*F21W 107/10* (2018.01)

(58) Field of Classification Search
CPC ........ F21S 41/265; F21S 41/27; F21S 41/275;
F21S 41/28; F21S 41/29; F21S 41/295;
F21W 2102/13
See application file for complete search history.

(56) References Cited

FOREIGN PATENT DOCUMENTS

| | | |
|---|---|---|
| CN | 208269029 | 12/2018 |
| CN | 208919975 | 5/2019 |
| CN | 109838748 | 6/2019 |
| CN | 109838753 | 6/2019 |
| DE | 102005011760 | 9/2006 |
| DE | 102016102456 | 8/2017 |
| DE | 102017109905 | 11/2018 |
| EP | 3205928 | 8/2017 |

OTHER PUBLICATIONS

"International Search Report (Form PCT/ISA/210) of PCT/CN2019/096954", dated Apr. 13, 2020, with English translation thereof, pp. 1-6.

\* cited by examiner

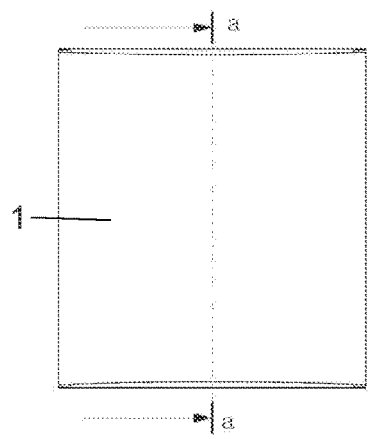
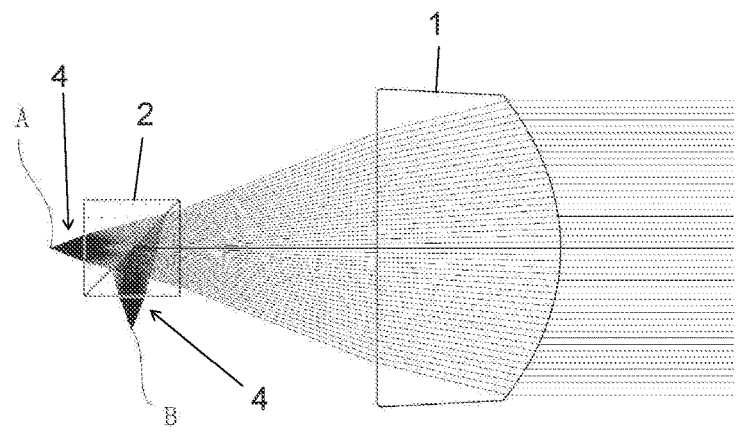
FIG. 3a  FIG. 3b
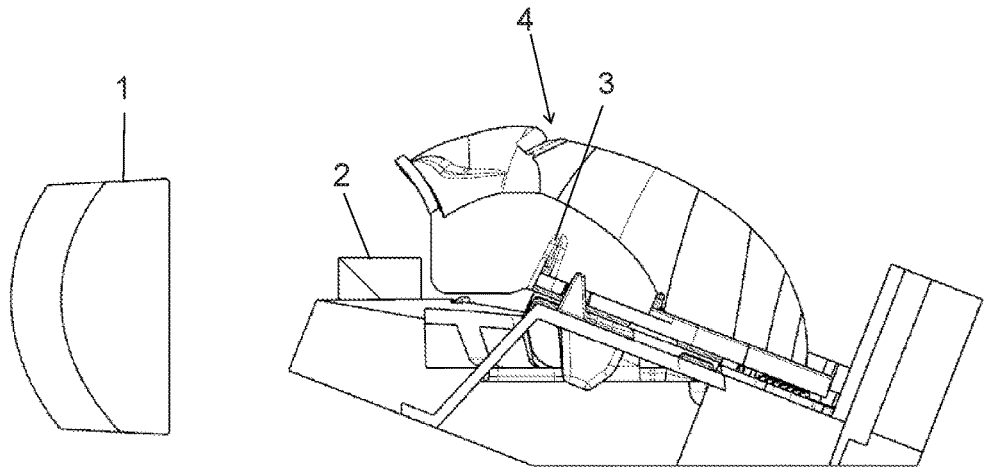
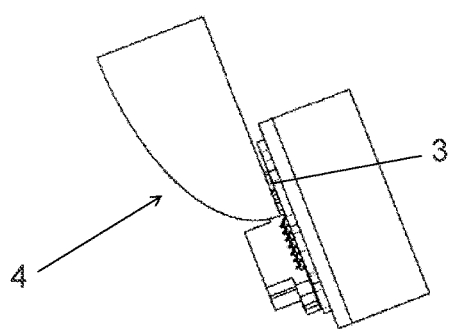
FIG. 4a

HEADLAMP UNIT BASED ON A POLARIZED BEAM SPLITTER AND AT LEAST TWO LIGHT PATH SYSTEMS

CROSS-REFERENCE TO RELATED APPLICATION

This application is a 371 of international application of PCT application serial no. PCT/CN2019/096954, filed on Jul. 20, 2019, which claims the priority benefit of China application no. 201910624948.7, filed on Jul. 11, 2019. The entirety of each of the above mentioned patent applications is hereby incorporated by reference herein and made a part of this specification.

BACKGROUND OF THE INVENTION

1. Technical Field

The invention relates to a vehicle headlamp, and in particular to a headlamp unit based on a polarized beam splitter (PBS).

2. Description of Related Art

An existing vehicle lamp lens is as shown in FIG. 1 and is generally a collimating lens with a single focus. Therefore, only one light shape can be imaged. When two light shapes are imaged through one lens at the same time, such as an upper beam and lower beam integrated illumination unit, a light shielding plate with a switchable position is generally required to be arranged for switching an upper beam and a lower beam. Since the position switching process of the light shielding plate needs to be achieved through mechanical movement, a series of defects such as noise and abrasion are caused.

In the prior art, switching between an upper beam and a lower beam is also achieved through a light source switch, and light sources are arranged for the upper beam and the lower beam respectively. However, since there is only one lens focus, an ideal illumination light shape integrating the upper beam and the lower beam is difficult to splice. Meanwhile, since an upper beam illumination system cannot irradiate a lower beam area, obvious brightness abrupt change exists at a junction of an upper beam illumination light shape and a low beam illumination light shape.

BRIEF SUMMARY OF THE INVENTION

The objective of the invention is to provide a headlamp unit based on a PBS. Through the PBS, light rays may come in from two or more directions, and are synthesized into a light shape through the PBS to provide vehicle illumination. Meanwhile, corresponding light sources may be turned on and off according to needs to achieve a needed light pattern. Two or more lens focuses are separated by the PBS, so that an ideal light pattern may be accurately obtained. A lower beam pattern may be partially covered by an upper beam pattern, so that obvious brightness abrupt change at a junction of the beam patterns may be avoided.

The invention adopts the following technical solutions:

The headlamp unit based on the PBS includes a lens and a beam splitter. Viewed from a reverse light path, parallel light is refracted twice by an incident surface and an emergent surface of the lens and then converged in at least two focuses through the beam splitter. Each focus corresponds to a light path system, and the light path systems may be turned on simultaneously or separately to obtain a corresponding headlamp light pattern.

Preferably, a light pattern formed when each of the light path systems is separately turned on partially coincides with a light pattern formed when the rest of the light path systems are turned on separately.

Further, the PBS enables the lens to have two focuses, and imaging of two independent optical systems is achieved respectively. The two optical systems are two upper beam systems, two lower beam systems, or one lower beam system and one upper beam system. The two optical systems synthesize a light shape through the PBS, and after passing through the lens, the light shape irradiates a road surface to form a complete illumination light shape.

Further, the PBS enables the lens to have a plurality of focuses, and imaging of a plurality of independent optical systems is achieved respectively. The plurality of optical systems are a plurality of upper beam systems and a plurality of lower beam systems, or one lower beam system and a plurality of upper beam system, respectively. The plurality of optical systems synthesizes a compound light shape through the PBS, and after passing through the lens, the compound light shape irradiates a road surface to form a complete illumination light shape.

Furthermore, the two or plurality of independent optical systems are provided with independent light sources, respectively, and different light shapes may be achieved through on-off combination of the light sources.

Furthermore, the two or plurality of lower beam optical systems are subjected to beam combination through the PBS. A common lower beam illumination function is achieved when light sources of the two or plurality of lower beam optical systems are all turned on, and a W-grade light shape in an AFS rule is achieved when one or more of the light sources are turned off or brightness of one or more of the light sources is reduced.

Furthermore, the two or plurality of upper beam systems are subjected to beam combination through the PBS. Common light illumination is achieved when one light source is turned on, and enhanced upper beam illumination and/or other vehicle lamp functions are achieved when two or more light sources are all turned on.

Furthermore, at least one of the lower beam systems and at least one of the upper beam systems are subjected to beam combination through the PBS. Lower beam illumination is achieved when part or all lower beam light sources are turned on, and two or more different forms of upper beam illumination are achieved when part or all upper beam light sources are turned on, or the light sources of the upper beam and lower beam optical systems are turned on together.

The invention has the following beneficial effects:

1) the two optical systems may achieve different illumination light shapes through on-off combination of the light sources, and the two optical systems do not interfere with each other.

2) through the PBS, light rays may come in from two or more directions, and are synthesized into a light shape through the PBS to provide vehicle illumination. Corresponding light sources may be turned on and off according to needs to achieve a needed light pattern.

3) The PBS obtains at least two accurate focus positions for the focuses of the lens, and an ideal light pattern may be accurately obtained.

4) An upper beam light pattern may partially cover a lower beam light pattern, and obvious brightness abrupt change at a junction of the light patterns may be avoided.

BRIEF DESCRIPTION OF THE SEVERAL VIEWS OF THE DRAWINGS

FIG. 3a is a front view of a lens combined with a beam splitter.

FIG. 3b is a cross-sectional view in an a-a direction in FIG. 3a.

FIG. 4a is a front view of a headlamp unit based on a PBS.

FIG. 4b is a left view of FIG. 4a.

FIG. 5a is another front view of a headlamp unit based on a PBS.

FIG. 5b is a cross-sectional view of FIG. 5a.

FIG. 10 is a schematic diagram of a compound upper beam light pattern realized when a pair of light path systems are simultaneously turned on.

In FIGURES, A denotes a focus corresponding to a lower beam light pattern, B denotes a focus corresponding to an upper beam light pattern, C denotes a focus of another upper beam light pattern, 1 denotes a lens, 2 denotes a PBS, 3 denotes a light source and 4 denotes an optical system.

DETAILED DESCRIPTION OF THE INVENTION

The invention will be described further with reference to the accompanying drawings and specific embodiments.

Referring to FIGS. 2-10, a headlamp unit based on a PBS includes a lens 1 and a beam splitter 2. Viewed from a reverse light path, parallel light is refracted twice by an incident surface and an emergent surface of the lens and then converged in at least two focuses after being reflected by the beam splitter 2. Each focus corresponds to a light path system, and the light path systems may be turned on simultaneously or separately to obtain a corresponding headlamp light pattern. The light pattern irradiates a road surface to form a complete illumination light shape.

In this embodiment, a light pattern formed when each of the light path systems is separately turned on partially coincides with a light pattern formed when the rest of the light path systems are turned on separately.

As a preferable solution, as shown in FIGS. 3-8, the PBS enables the lens to have two focuses, and imaging of two independent optical systems is achieved respectively. The two optical systems are two upper beam systems, two lower beam systems, or one lower beam system and one upper beam system. The two optical systems synthesize a light shape through the PBS, and after passing through the lens, the light shape irradiates a road surface to form a complete illumination light shape.

As a preferable solution, as shown in FIGS. 6-10, the two optical systems are provided with independent light sources, respectively, and different light shapes may be achieved through on-off combination of the light sources.

In this embodiment, two lower beam optical systems are subjected to beam combination through the PBS. A common lower beam illumination function is achieved when the light sources of the two optical systems are both turned on, and a W-grade light shape in an adaptive front-lighting system (AFS) rule is achieved when one of the light sources is turned off or brightness of one of the light sources is reduced. The accompanying drawings do not show this, which do not affect the understanding of those of ordinary skill in the art.

Figure 9:
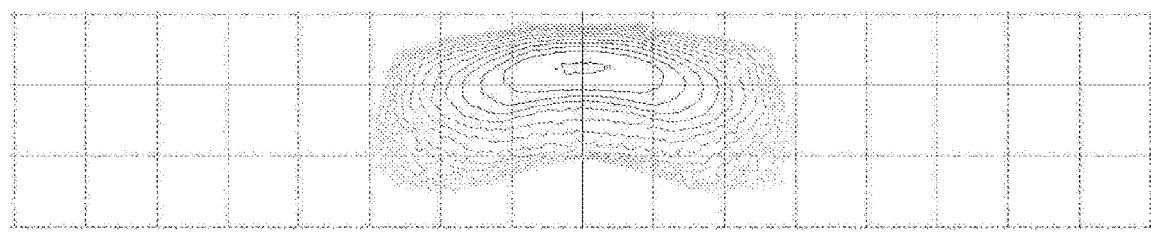
FIG. 9 is a schematic diagram of an upper beam light pattern.
Figure 10:
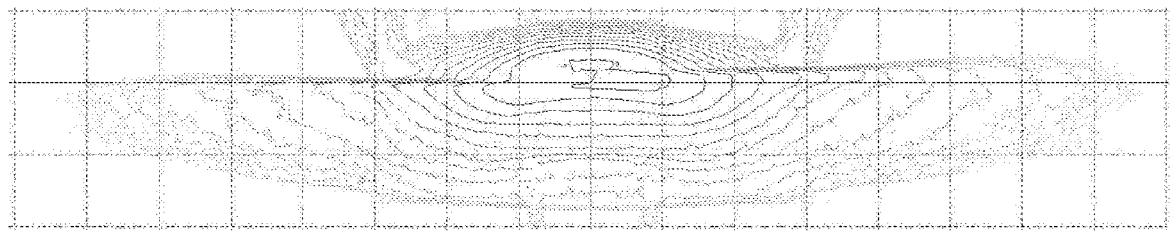

In this embodiment, two upper beam systems are subjected to beam combination through the PBS. Common light illumination is achieved when one of the light sources is turned on, as shown in FIG. 9. Enhanced upper beam illumination such as a highway upper beam mode is achieved when the two light sources are both turned on, as shown in FIG. 10.

Figure 1:
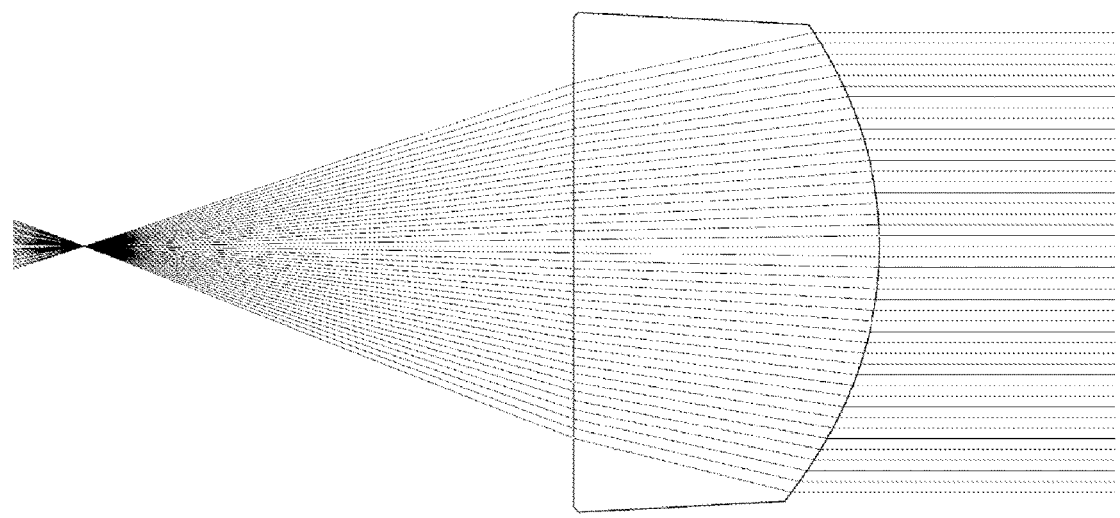
FIG. 1 is a schematic diagram of lens focusing.
Figure 2:
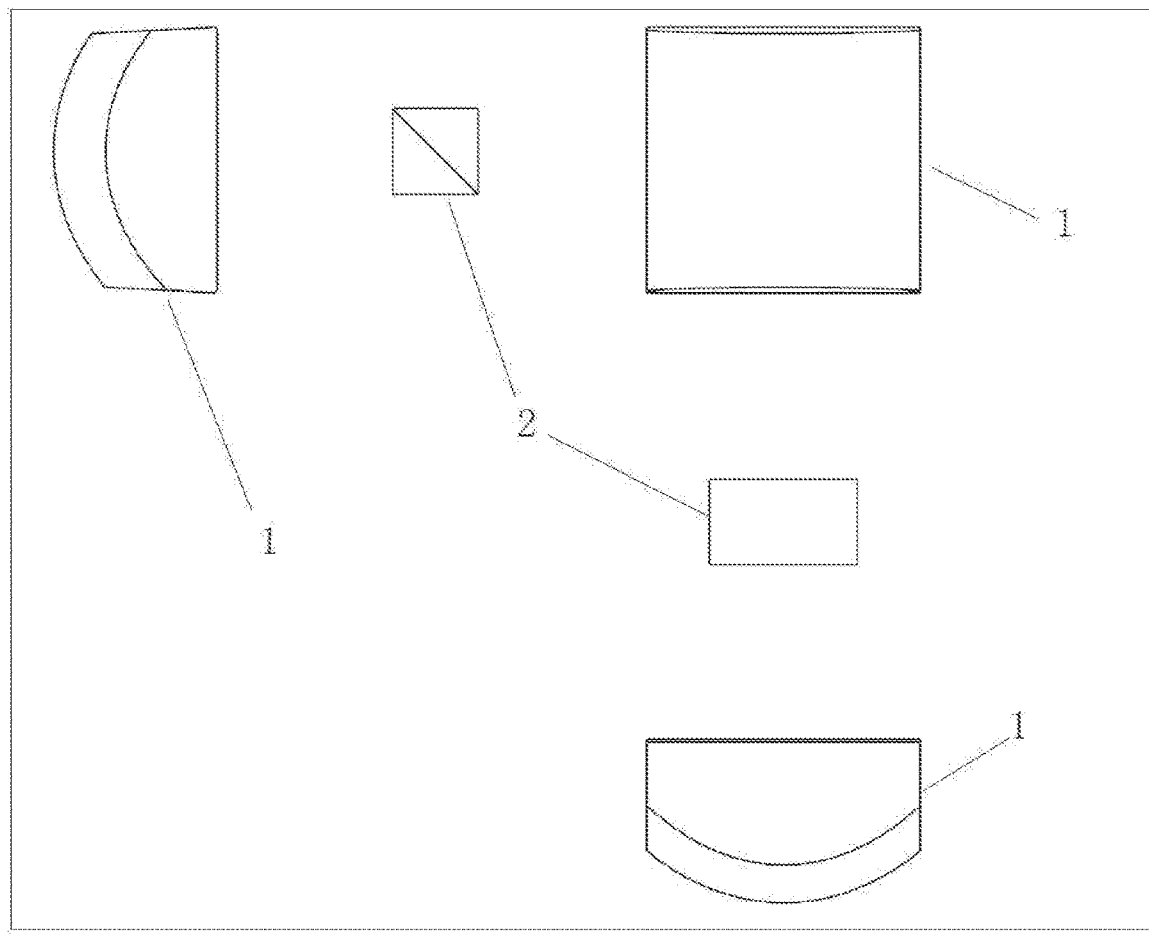
FIG. 2 is a schematic diagram of relative positions of a lens and a condenser, showing independent views of the lens and a beam splitter at different viewing angles, which is a combined view.
Figure 4B:
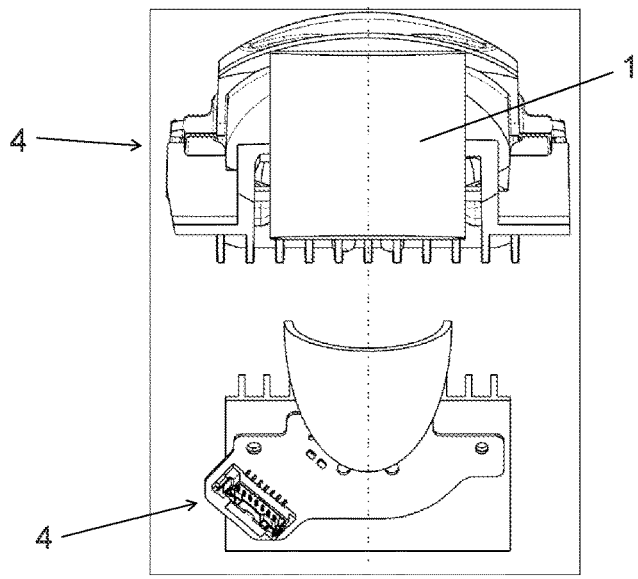
Figures 5A, 5B:
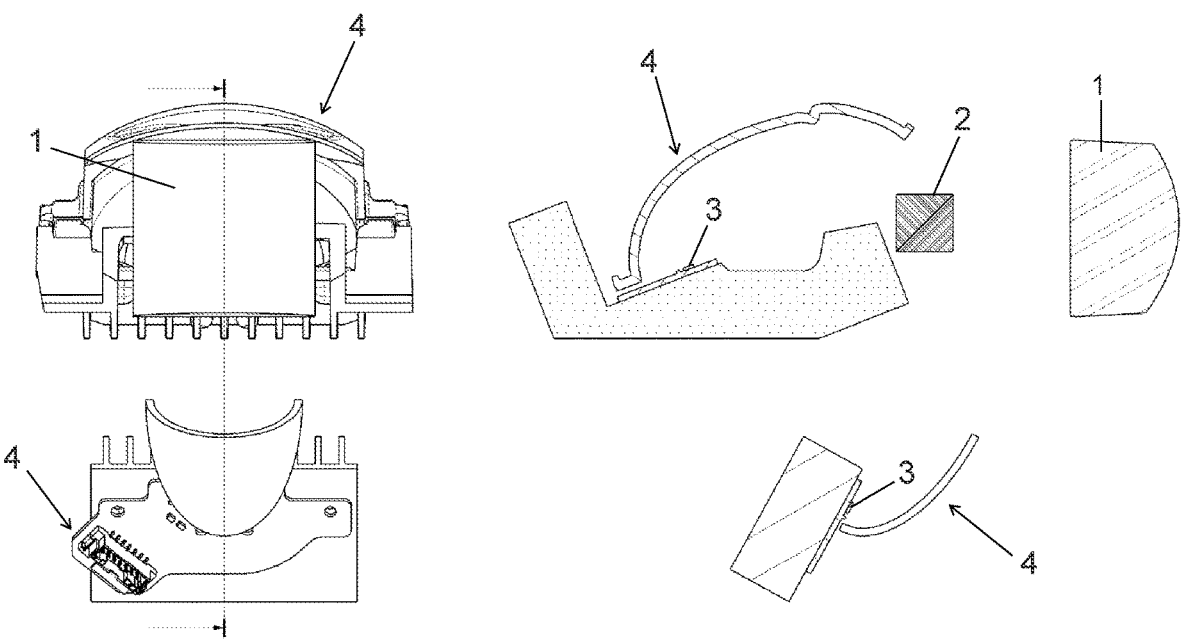
Figure 6:
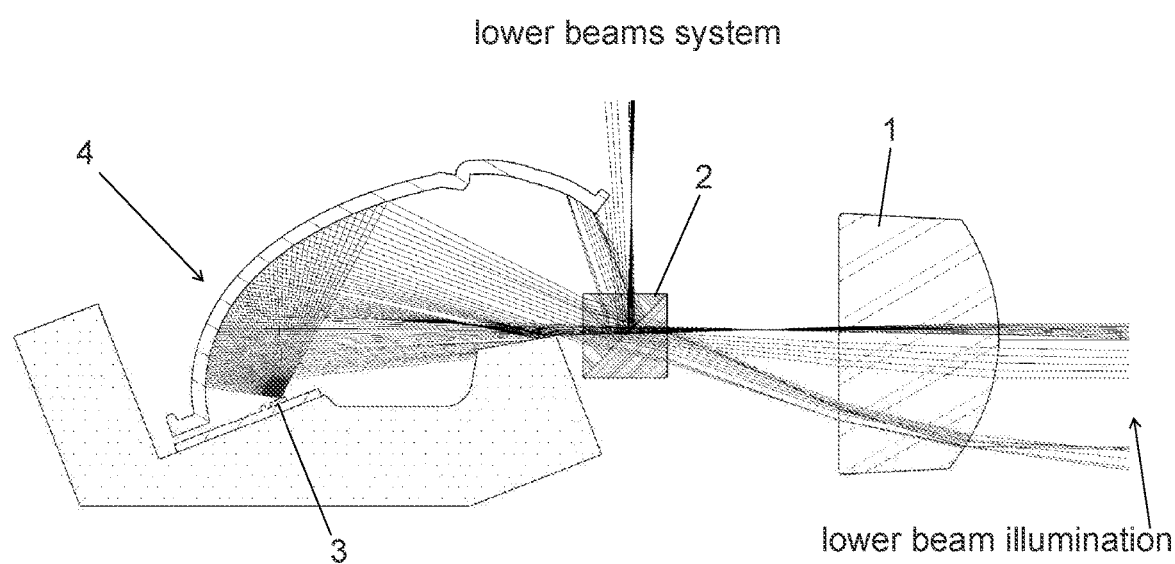
FIG. 6 is a schematic diagram of a direction of a lower beam light ray in an embodiment.
Figure 7:
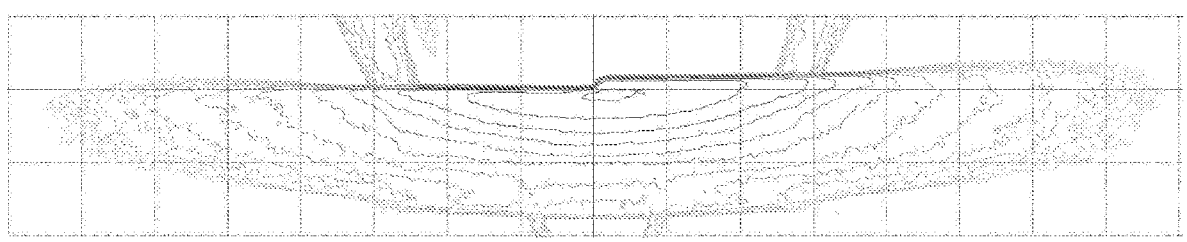
FIG. 7 is a schematic diagram of a lower beam light pattern in an embodiment.
Figure 8:
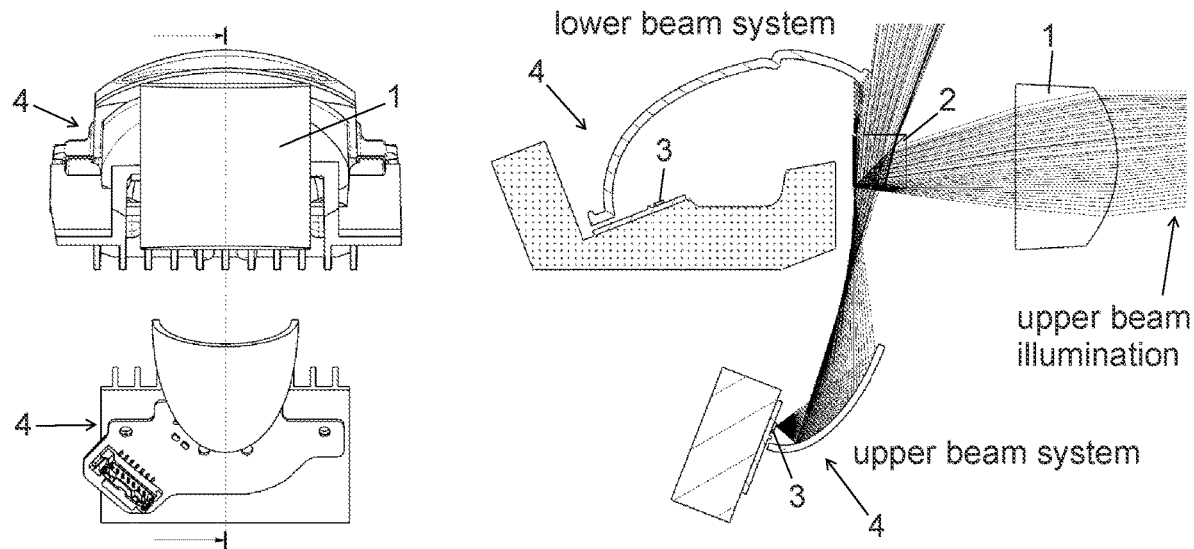
FIG. 8 is a schematic diagram of directions of light rays when upper beam and lower beam light path systems are simultaneously turned on in an embodiment.

In this embodiment, one lower beam system and one upper beam systems are subjected to beam combination through the PBS. Lower beam illumination is achieved when the lower beam light source is turned on, as shown in FIGS. 6-7. Two different forms of upper beam illumination are achieved when the upper beam light source is turned on, or the light sources of the upper beam and lower beam optical systems are turned on together, as shown in FIGS. 8-10.

Through the above beam combination by the beam splitter, the two optical systems may achieve different illumination light shapes through on-off combination of the light sources, and the two optical systems do not interfere with each other. An upper beam light pattern may partially cover a lower beam light pattern, and obvious brightness abrupt change at a junction of the light patterns may be avoided.

Figure 11:
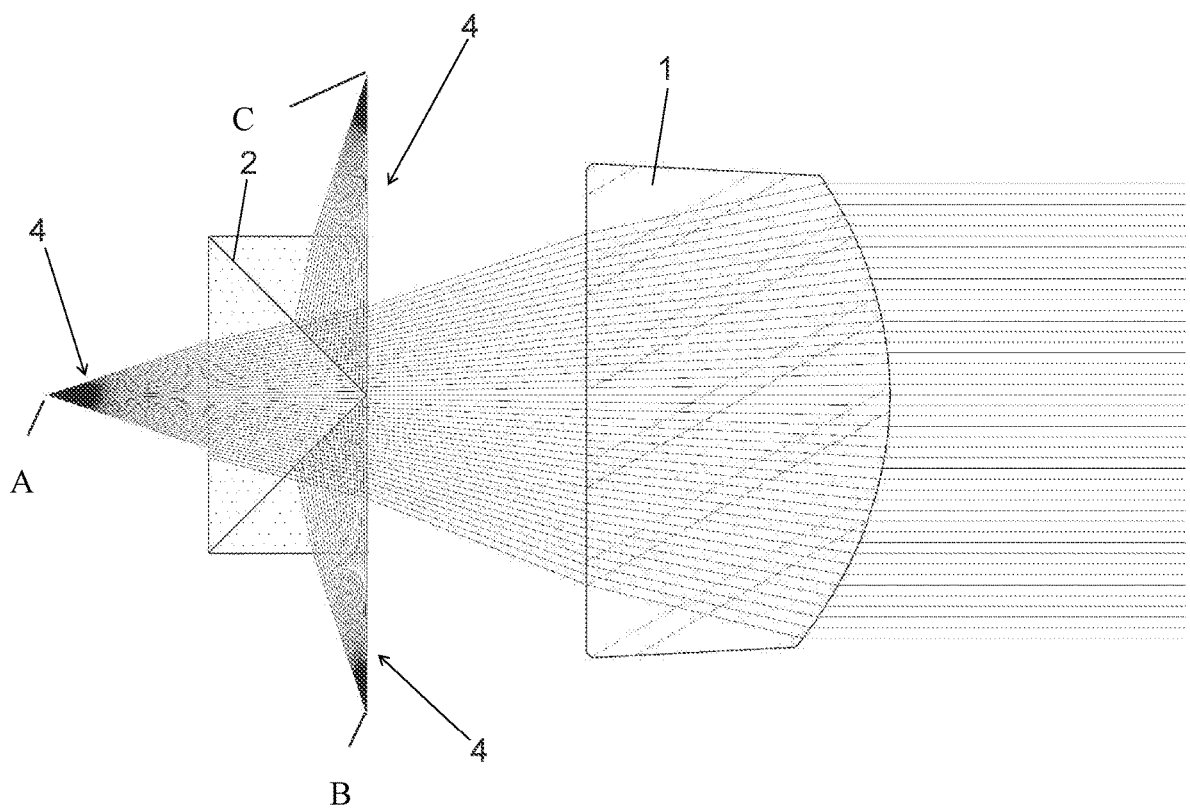
FIG. 11 is a schematic diagram of a lens combined with a beam splitter in another embodiment, in which the beam splitter converts a focus of the lens into focuses A, B and C.

In another embodiment, referring to FIG. 11 which is a schematic diagram of a lens combined with a beam splitter, the beam splitter converts a focus of the lens into focuses A, B and C. These three focuses achieve imaging of three independent optical systems, respectively. The three independent optical systems are a lower beam system and two upper beam systems, respectively. The three optical systems synthesize a compound light shape, and after passing through the lens, the compound light shape irradiates a road surface to form a complete illumination light shape. This embodiment may also be further expanded, the number of lower beam systems and the number of upper beam systems are not limited to 1 and 2, but may also be multiple (at least 1 each). All or part of the light sources are turned on according to actual design requirements. A compound light shape is synthesized through the PBS, and irradiates a road surface to form a complete illumination light shape.

The above are the preferred embodiments of the invention, those of common skill in the art may also make various transformations or improvements on this basis. Without deviating from the general idea of the invention, these transformations or improvements should fall within the scope of protection claimed by the invention.

What is claimed is:

1. A headlamp unit based on a polarized beam splitter (PBS), comprising a lens and a beam splitter, wherein:
   the beam splitter is disposed on transmission paths of at least two light beams and adapted to reflect at least one of the at least two light beams, and let at least the other one of the at least two light beams pass through, wherein the at least two light beams are visible light beams, and the lens is disposed on the transmission paths of the at least two light beams from the beam splitter to form light path systems, wherein following a reverse light path, parallel light is refracted twice by an incident surface and an emergent surface of the lens and then converged in at least two focuses through the beam splitter, each of the at least two focuses correspond to one of the light path systems, and the light path systems are turned on simultaneously or separately to obtain a corresponding headlamp light pattern.

2. The headlamp unit based on the PBS according to claim 1, wherein a light pattern formed when each of the light path systems is separately turned on partially coincides with a light pattern formed when the rest of the light path systems are turned on separately.

3. The headlamp unit based on the PBS according to claim 2, wherein the PBS enables the lens to have two focuses, imaging of two independent optical systems is achieved respectively, the two optical systems are two upper beam systems, two lower beam systems, or one lower beam system and one upper beam system, the two optical systems synthesize a light shape through the PBS, and after passing through the lens, the light shape irradiates a road surface to form a complete illumination light shape.

4. The headlamp unit based on the PBS according to claim 2, wherein the PBS enables the lens to have a plurality of focuses, imaging of a plurality of independent optical systems is achieved respectively, the plurality of optical systems are a plurality of upper beam systems and a plurality of lower beam systems, or one lower beam system and a plurality of upper beam system, respectively, the plurality of optical systems synthesize a compound light shape through the PBS, and after passing through the lens, the compound light shape irradiates a road surface to form a complete illumination light shape.

5. The headlamp unit based on the PBS according to claim 1, wherein the PBS enables the lens to have two focuses, imaging of two independent optical systems is achieved respectively, the two optical systems are two upper beam systems, two lower beam systems, or one lower beam system and one upper beam system, the two optical systems synthesize a light shape through the PBS, and after passing through the lens, the light shape irradiates a road surface to form a complete illumination light shape.

6. The headlamp unit based on the PBS according to claim 5, wherein the two or plurality of independent optical systems are provided with independent light sources, respectively, and different light shapes are achieved through on-off combination of the light sources.

7. The headlamp unit based on the PBS according to claim 5, wherein the two or plurality of lower beam optical systems are subjected to beam combination through the PBS, a common lower beam illumination function is achieved when light sources of the two or plurality of lower beam optical systems are all turned on, and a light shape in an adaptive front-lighting system (AFS) rule is achieved when one or more of the light sources are turned off or brightness of one or more of the light sources is reduced.

8. The headlamp unit based on the PBS according to claim 5, wherein the two or plurality of upper beam systems are subjected to beam combination through the PBS, common light illumination is achieved when one light source is turned on, and enhanced upper beam illumination and/or other vehicle lamp functions are achieved when two or more light sources are all turned on.

9. The headlamp unit based on the PBS according to claim 5, wherein at least one of the lower beam systems and at least one of the upper beam systems are subjected to beam combination through the PBS, lower beam illumination is achieved when part or all lower beam light sources are turned on, and two or more different forms of upper beam illumination are achieved when part or all upper beam light sources are turned on, or the light sources of the upper beam and lower beam optical systems are turned on together.

10. The headlamp unit based on the PBS according to claim 1, wherein the PBS enables the lens to have a plurality of focuses, imaging of a plurality of independent optical systems is achieved respectively, the plurality of optical systems are a plurality of upper beam systems and a plurality of lower beam systems, or one lower beam system and a plurality of upper beam system, respectively, the plurality of optical systems synthesize a compound light shape through the PBS, and after passing through the lens, the compound light shape irradiates a road surface to form a complete illumination light shape.

11. The headlamp unit based on the PBS according to claim 10, wherein the two or plurality of independent optical systems are provided with independent light sources, respectively, and different light shapes are achieved through on-off combination of the light sources.

12. The headlamp unit based on the PBS according to claim 10, wherein the two or plurality of lower beam optical systems are subjected to beam combination through the PBS, a common lower beam illumination function is achieved when light sources of the two or plurality of lower beam optical systems are all turned on, and a light shape in an adaptive front-lighting system (AFS) rule is achieved when one or more of the light sources are turned off or brightness of one or more of the light sources is reduced.

13. The headlamp unit based on the PBS according to claim 10, wherein the two or plurality of upper beam systems are subjected to beam combination through the PBS, common light illumination is achieved when one light source is turned on, and enhanced upper beam illumination and/or other vehicle lamp functions are achieved when two or more light sources are all turned on.

14. The headlamp unit based on the PBS according to claim 10, wherein at least one of the lower beam systems and at least one of the upper beam systems are subjected to beam combination through the PBS, lower beam illumination is achieved when part or all lower beam light sources are turned on, and two or more different forms of upper beam illumination are achieved when part or all upper beam light sources are turned on, or the light sources of the upper beam and lower beam optical systems are turned on together.

* * * * *